United States Patent [19]
Farmer

[11] Patent Number: 6,028,548
[45] Date of Patent: Feb. 22, 2000

[54] VEHICLE COLLISION RADAR WITH RANDOMIZED FSK WAVEFORM

[75] Inventor: Michael E. Farmer, West Bloomfield, Mich.

[73] Assignee: Automotive Systems Laboratory, Inc., Farmington Hills, Mich.

[21] Appl. No.: 09/352,632

[22] Filed: Jul. 13, 1999

Related U.S. Application Data

[63] Continuation of application No. 09/007,992, Jan. 16, 1998, Pat. No. 5,923,280
[60] Provisional application No. 60/035,453, Jan. 17, 1997.

[51] Int. Cl.[7] .................................................. G01S 13/93
[52] U.S. Cl. ........................... 342/70; 342/129; 342/133; 342/135; 342/192; 342/72
[58] Field of Search ................................. 342/70, 71, 72, 342/128, 129, 133, 135, 192, 194, 203

[56] References Cited

U.S. PATENT DOCUMENTS

| | | | |
|---|---|---|---|
| 4,003,049 | 1/1977 | Sterzer et al. | 342/43 |
| 5,068,654 | 11/1991 | Husher | 455/502 |
| 5,181,038 | 1/1993 | Asbury et al. | 342/70 |
| 5,189,426 | 2/1993 | Asbury et al. | 342/101 |
| 5,285,207 | 2/1994 | Asbury et al. | 342/129 |
| 5,400,032 | 3/1995 | Asbury et al. | 342/70 |
| 5,923,280 | 7/1999 | Farmer | 342/70 |

*Primary Examiner*—John B. Sotomayor
*Attorney, Agent, or Firm*—Lyon, P.C.

[57] ABSTRACT

An automotive radar incorporates a repetitive randomized equivalent LFM sequence of frequencies for improved immunity to jamming from other automotive radars. Each frequency in the sequence is of sufficient duration to travel round trip over the detection range of the radar. The Doppler shift in the received signal is estimated by performing a spectral analysis on similar frequency components of the received signal, and is then removed from the entire received signal. The received signal is then reordered so as to form an equivalent LFM received signal, and is compared with a similarly reordered image of the transmitted signal so as to estimate the range to the target. The randomization sequence, initial start frequency, or initial start time of the repetitive sequence are varied to minimize the effects of jamming by other radars, and this variation can be directionally dependent.

23 Claims, 5 Drawing Sheets

VEHICLE COLLISION RADAR WITH RANDOMIZED FSK WAVEFORM

CROSS-REFERENCE TO RELATED APPLICATIONS

The instant application claims the benefit of prior U.S. Provisional Application Ser. No. 60/035,453 filed on Jan. 17, 1997.

The instant application further claims the benefit of U.S. application Ser. No. 09/007,992 filed on Jan. 16, 1998.

The above-identified applications are incorporated herein by reference.

TECHNICAL ART

The instant invention generally relates to radar systems and more particularly to automotive radar systems incorporated in vehicle collision avoidance and in vehicle safety restraint systems.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Known deployment systems for vehicle safety devices such as an air bag require the host vehicle to actually collide with an obstacle or other vehicle before the deployment decision process begins. At that point in time, the sensors detect a deceleration in the host vehicle and deploy one or more safety systems. Thus, the crash is identified based solely on the characteristic of the acceleration versus time measure. The disadvantage with existing post-crash detection systems derives from the fact that the time available to deploy an active safety device is very short, particularly for side impact or high speed frontal collisions where occupant restraint systems can provide significant safety benefits. These short time frames lead to rates of inflation of the airbags that are so great that injury or death are possible if the occupant is not well aligned with the airbag.

One technique for mitigating injury by the air bag inflator to occupants is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury by the air bag inflator to occupants is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. however, the risk of injury to such occupants would not be mitigated under the conditions of higher crash severity when the inflator is intentionally made aggressive in order to provide sufficient restraint for normally positioned occupants.

Ideally, the air bag would be inflated prior to any interaction with a normally seated occupant, and at a rate which is sufficiently slow that an out of position occupant would not be injured by the inflating air bag. For a crash of sufficient severity, this requires the crash sensing system to be able to predict immanent crashes because the time required to inflate the bag at an inflation rate that is sufficiently slow to be safe for out-of-position occupants may be greater than either that required for the occupant to move so as to commence interaction with an inflated air bag or to safely decelerate the occupant.

Current sensing technology uses accelerometers to detect the occurrence of the actual crash and therefore make it impossible to activate the safety devices prior to the crash. Radar sensors are currently being investigated for intelligent cruise control applications that merely provide a convenience to the operator of the vehicle in terms of maintaining a safe distance from other vehicles. Failure of such a system will only inconvenience the driver and force them to maintain their own distance. Collision prediction sensors, however, must operate with 100 percent effectiveness since the passenger safety is at risk. In light of this the system must operate in a reliable and robust manner under all imaginable operating conditions and traffic scenarios. Known automotive radar systems use either a dual frequency ranging method, or continuous linear frequency modulated (FM) signals. The dual frequency method uses two tones to derive range from the relative phase between the two signals. The linear FM approach uses a continuously swept ramped waveform of increasing frequency with time.

This is then repeated over and over.

The dual tone method is useful for a single target within the radar beam for estimating the range. However, in a predictive collision sensing application, the radar needs to track multiple targets at varying ranges within a field of interest because each such target is a potential collision.

The linear FM approach is susceptible to corruption due to non-linearities in the frequency ramp of the signal. This in turn causes blurring of the point spread function and reduces the resolution and accuracy of the signals. In addition, since the linear FM approach will have all cars in a general vicinity operating at effectively the same ramp rate and frequency band of operation, there is a high probability of signal interference between with each individual radar unit. Only the time variation of the signals due to the differing start times of the radars will provide interference immunity. It is also very possible for two radars to be close enough in the start time of their ramps that they would completely overlap and interfere when the main lobes of the respective antennas of the two systems are directed at each other or when the main lobe of one system is in the other system's side lobes, which is a very likely occurrence for collision prediction systems having a very wide field of view (>180 degrees). Such interference can cause a system to either miss detecting a target, or detect a false target when none is present.

SUMMARY OF THE INVENTION

The instant invention solves the above-noted problems by providing a randomized frequency shifting sequence for generating a linear Frequency Modulation (LFM) equivalent signal for continuous wave (CW) radar ranging so as to provide improved sensor reliability and robustness for automotive collision prediction. A LFM waveform is simulated through a sequence of discrete frequency steps which are then randomized in time prior to transmission. The random pattern is unique for each radar in operation and provides improved immunity to inadvertent jamming of the system by other systems in a dense signal environment such as can be expected with automotive radars. The system of the instant invention is also capable of dynamically modifying its pseudo-random code based on statistical analysis of the background radiation from each beam location where the radar system dwells. This ability of self-adaptation with no operator intervention provides a key benefit to automotive collision prediction systems which must operate with 100 percent availability to ensure the ability of the system to protect the vehicle and its occupants.

The instant invention provides an automotive radar having a waveform that is highly immune to interference from other radars operating in the same vicinity, and that has a high range resolution and is not degraded by Doppler effect caused by moving targets.

For automotive applications where hundreds of automobiles may be in the same area all transmitting (i.e. large city traffic jams), the performance of the instant invention is significantly less susceptible to degradation than prior art devices because of the following three levels of randomization that will allow many radars (>100) to operate simultaneously: 1) random ordering of frequency, 2) random selection of absolute frequencies for each step, and 3) random start times for ramps. In accordance with the instant invention, the random frequency shift keyed approach to a frequency modulated waveform can provide every vehicle with a completely different ordering of frequencies used, in contrast with known system which provide all vehicles with a common ramp. The system allows for three levels of randomization to provide enhanced immunity.

For a 64 element code, there are over $10^{89}$ possible combinations of frequencies to use. This becomes even larger if a varying set of frequencies is used in addition to a random ordering of those frequencies as noted above. With such an arrangement, the instant invention significantly virtually eliminates the possibility of signal interference between closely operating systems.

Accordingly, one object of the instant invention is to provide an improved and robust Linear Frequency Modulated (LFM) Continuous Wave (CW) Radar for automotive applications which is immune to inadvertent jamming by other radar systems operating in proximity to and within the same frequency band of operation as the instant invention.

A further object of the instant invention is to provide an improved automotive radar that is relatively immune to the effects of system voltage and temperature fluctuations which may cause non-linearities in conventional LFM waveform systems.

A yet further object of the instant invention is to provide a means for the system to dynamically detect the presence of an interfering RF source that could corrupt the sensor results.

A yet further object of the instant invention is to select alternate random frequency sequences upon detecting the possible presence of a jamming source with a frequency sequence that is similar enough to reduce the system performance noticeably.

A yet further object of the instant invention is to provide the ability to support multiple interfering sources from various directions simultaneously.

A yet further object of the instant invention is to provide the ability to support randomized frequency patterns for both stationary and moving targets.

In accordance with these objectives, one feature of the instant invention is that the system uses a pre-computed and digitally stored sequence of frequencies that are then executed by the radar transmitter to generate the desired frequency pattern.

Another feature of the instant invention is the incorporation of an up-converting mixer architecture for the radar system that generates the frequency stepping at a lower intermediate frequency and then up-converts this signal to the desired carrier frequency.

Yet another feature of the instant invention is that the associated signal processor uses this same sequence to re-order the frequencies and corrects the phases of these re-ordered values to generate a frequency stepped waveform that approximates an analog LFM waveform and allow traditional Fourier Transform processing on the incoming waveform.

Yet another feature of the instant invention is that the signal processor uses the randomized frequency patterns across multiple frequency sequences to determine the Doppler shifts that exist in the signal so as to provide a means for removing these Doppler signals and then process the target range information from the signal.

Yet another feature of the instant invention is the incorporation of a direct digital synthesizer (DDS) to accurately generate frequency step values with great immunity to supply voltage irregularities.

Yet another feature of the instant invention is that it automatically senses changes in the system noise performance and modifies the coded sequence to minimize potential interference from other radar sources.

Yet another feature of the instant invention is the incorporation of different coded sequences for different antenna pointing directions to improve performance against multiple interfering sources from multiple locations.

The specific features of the instant invention provide a number of associated advantages. One advantage of the instant invention with respect to the prior art is that by generating the frequency stepping at an intermediate frequency precludes the need to control a voltage controlled oscillator such as a Gunn diode directly to generate the stepping, thereby greatly improving the system's ability to withstand power supply voltage irregularities and further precluding the need for high speed RF switches to activate each of the delay lines.

Another advantage of the instant invention with respect to the prior art is that by using a frequency stepped approximation to an actual LFM waveform, the frequency sequence can be generated digitally such as with a direct digital synthesizer which is inherently more resistant to voltage fluctuations, or to changes in the operational characteristics of the radar.

Yet another advantage of the instant invention with respect to the prior art is that by incorporating a randomized sequence of frequency steps in very dense signal environments such as will be found in automotive applications where many cars may simultaneously be on the road, the system can use a unique random sequence which will have minimal overlap with any other system, thereby reducing the effects of interference which for a normal LFM system causes false target detection, and which for the instant invention causes the system noise floor to increase slightly and in a very predictable manner thereby making the system inherently more robust and less failure prone.

Yet another advantage of the instant invention with respect to the prior art is that the instant invention is immune to Doppler shifting due to moving targets which has heretofore precluded the development of truly non-linear FM signal modulation which is what the randomized pattern looks like to the target. By initially estimating these Doppler shifts and then removing them, the signal can be processed from the randomized sequence, thereby enabling the instant invention to be utilized in an automotive environment.

Yet another advantage of the instant invention with respect to the prior art is that by monitoring the noise floor of the radar returns, the instant invention can determine if another radar is operating with a similar code if the noise floor raises by a pre-determined amount, and if so the system can automatically incorporate a new code sequence so as to automatically adapt to the surroundings and provide more robust operation in all environments.

Yet another advantage of the instant invention with respect to the prior art is that by readily supporting different codes from different beam locations, the instant invention can more robustly ignore the effects of multiple interfering sources that may be randomly located around the vehicle to support operation in very dense traffic situations.

Accordingly, these and other objects, features, and advantages of the instant invention will be more fully understood after reading the following detailed description of the preferred embodiment with reference to the accompanying drawings. While this description will illustrate the application of the instant invention in automotive collision prediction, it will be understood by one with ordinary skill in the art that the instant invention can also be applied to other radar applications subject to potential interference, or where multiple beam apertures are operating in a CW mode of operation.

BRIEF DESCRIPTION OF THE DRAWINGS

FIG. 6 illustrates a cycle comprising a plurality of randomized discretized LFM signals in accordance with the instant invention.

FIG. 7 illustrates the process of removing a Doppler shift from the receive signal in accordance with the instant invention.

FIG. 8 is a block diagram illustrating the operation of the instant invention.

DETAILED DESCRIPTION OF THE PREFERRED EMBODIMENT(S)

Figure 1:
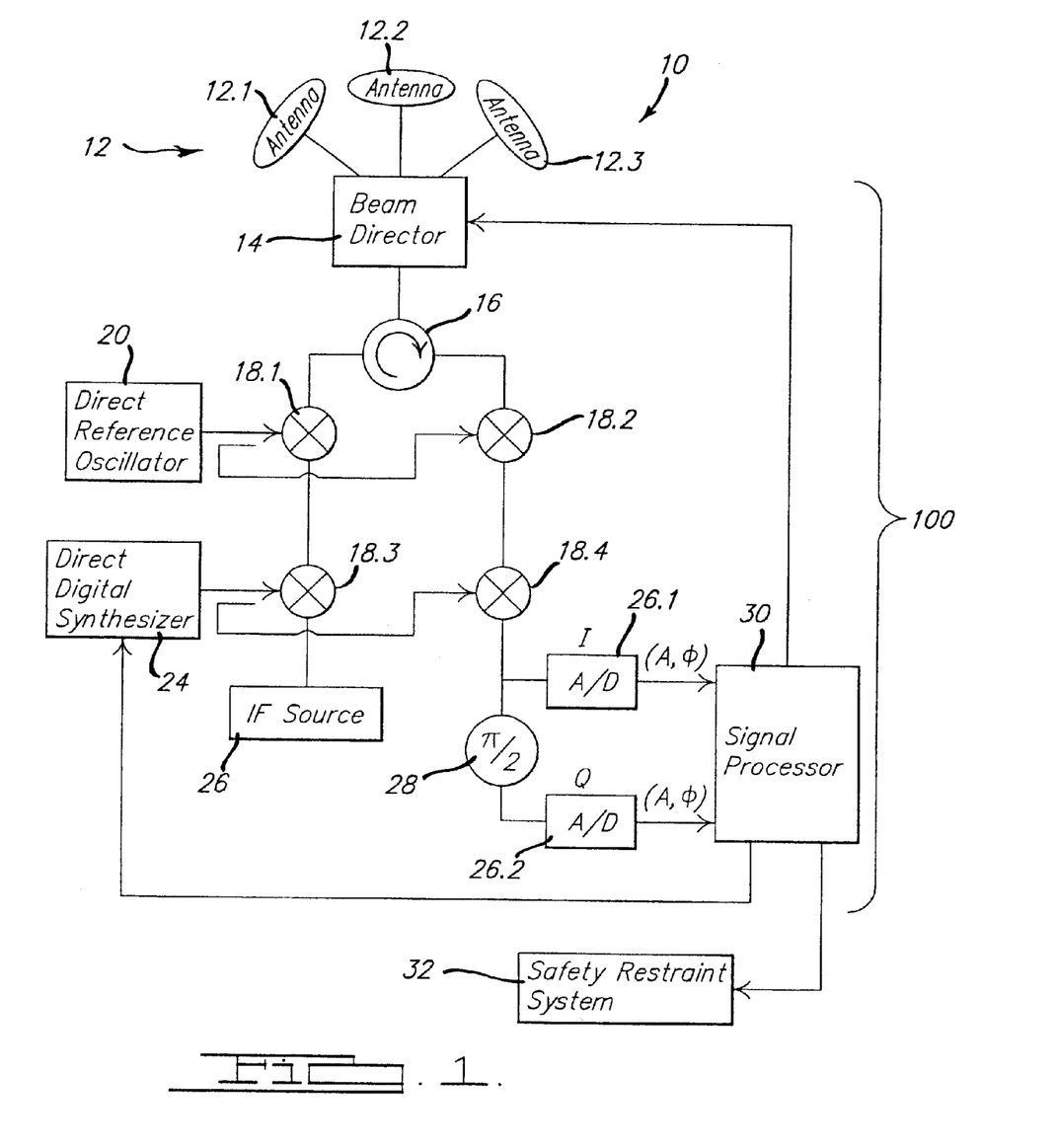
FIG. 1 illustrates a block diagram of the instant invention.

Referring to FIG. 1, a radar system 10 incorporates a direct digital synthesizer (DDS) 24 to synthesize a specific sequence of frequencies under the control of a signal processor 30. The direct digital synthesizer 24 varies the generated frequencies very quickly, for example by changing frequency within 40–100 nanosecond intervals. The direct digital synthesizer 24 may be developed from a single custom broadband device or from an off-the-shelf narrow band synthesizer with a comb filter network of offset frequencies which covers the entire desired frequency band, as is well understood by one having ordinary skill in the art. An intermediate frequency (IF) source 26 is mixed with the output of the direct digital synthesizer 24 by a mixer 18.3, and the output from the mixer 18.3 is further up-converted by mixing with the output from a direct reference oscillator (DRO) 20, or a Gunn diode, by a mixer 18.1 so as to produce an RF transmission signal having a frequency of approximately 47 GHz. The RF transmission signal passes through a circulator 16 into an antenna beam director 14 under control of the signal processor 30 which causes the signal to be transmitted by one or more of one or more antennas 12.1, 12.2, 12.3 so as to illuminate a region of interest proximate the vehicle 3. Either a plurality of fixed antennas 12.1, 12.2, 12.3, a single moveable antenna, or a phased array antenna may be incorporated without departing from the instant invention.

The transmitted signal is reflected from one or more either fixed or moving targets, and then received by the antenna system 12. The received signal is then directed by the circulator 16 to a mixer 18.2 which down-converts the signal by mixing with the output from the direct reference oscillator 20, and the down-converted signal is mixed with the output of the direct digital synthesizer 24 by a mixer 18.4 where it is further down converted so as to form a modulated IF radar signal. The modulated IF radar signal is phase shifted by a quadrature phase shifter 28, and both the modulated IF radar signal and the quadrature phase shifted version thereof are sampled by respective A/D converters 26.1, 26.2 so as to provide the signal processor 30 with a complex measure comprising the amplitude and phase (A,φ) of the modulated IF radar signal. The signal processor detects the range and velocity of targets within the field of view of the radar system 10 and predicts whether or not a collision will occur, and if so, sends an appropriately time signal to control the activation of the safety restraint system 32 so as to mitigate injury to the occupant.

Figure 2:
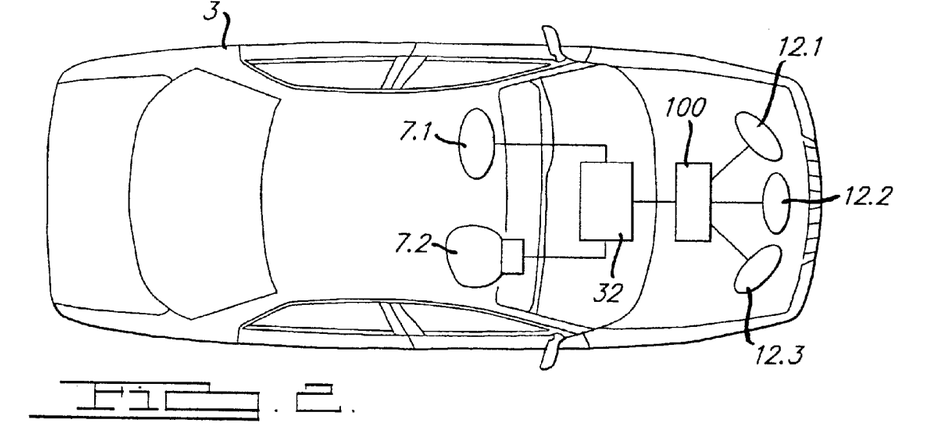
FIG. 2 illustrates the incorporation of the instant invention in a vehicle.

Referring to FIG. 2, the plurality of antennas 12.1, 12.2, 12.3 are mounted in the front of a vehicle 3 and are connected to a radar processor 100 which is further coupled to the safety restraint system 32, which for example activates frontal air bag systems 7.1, 7.2 responsive to a pending crash.

Figure 3:
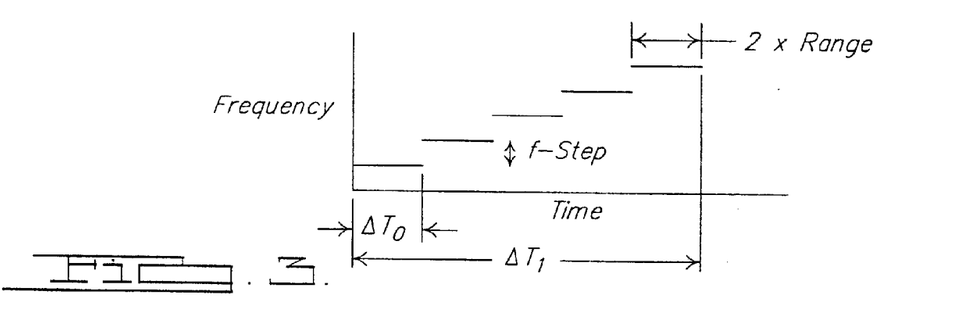
FIG. 3 illustrated a discretized LFM signal.

Referring to FIG. 3, the radar system 10 starts with a stepped, or discretized, frequency approach to approximate a linear FM signal. The duration of each step is set by the maximum range desired for the system. For example, a 128 meter maximum range would lead to a step length of 853 nanoseconds. The step size and range are related by the radar distance equation:

$$Range = c * \Delta T_0 / 2$$

where c is the speed of light and $\Delta T_0$ is the time of flight of the radar energy.

Likewise, since time=1/frequency, the frequency difference between each step would be set by the maximum range according to:

$$f\_step = c/2R\_max,$$

where f_step is the step size, c is the speed of light, and R_max is the maximum range. For 128 meters this would lead to f_step 1.17 MHz.

Figure 5:
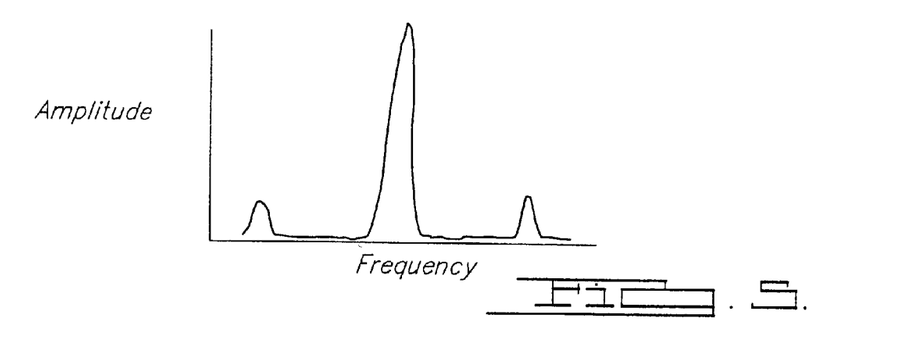
FIG. 5 illustrates the output of a direct digital synthesizer.

The radar system 10 is initially provided with a complete list of sets of start frequencies that when stepped by the amount required generates a set of frequencies that have a minimal set of common or constant offsets from the primary frequency. Note that due to the digital nature of the direct digital synthesizer 24, every frequency generated also generates spurious signals, or spurs, as illustrated by the sideband signals in FIG. 5. If a spur occurs at the same constant offset from the primary for every step then it will look like a false target. A set of start frequencies are used which minimize non-random spurs, wherein the magnitude of the spurs are related to the degree to which the desired operating frequency is prime relative to the internal clock of the direct digital synthesizer 24.

Referring to FIG. 3, upon start-up, the radar system 10 automatically generates the increasing set of steps for a given start frequency that it randomly chooses from list of start frequencies. The list is generated according to:

$$F[i] = F\_start + i * f\_step.$$

Then, list F[i] for i=0,Num_steps is stored in a memory in the radar processor. As a simple example, with F[0] randomly chosen to be 125, an 8-step set of frequencies would be:

F[0]=125
F[1]=126.17
F[2]=127.34
F[3]=128.51
F[4]=129.68
F[5]=130.85
F[6]=132.02
F[7]=133.19

Then, each vehicle is provided with at least one set of random sequences of numbers from 1 to Num_steps, Order [i], i=0, Num_steps. Again for the simple 8-element example, assume the random sequence generated was:

Order[0]=5
Order[1]=7
Order[2]=2
Order[3]=3
Order[4]=0
Order[5]=6
Order[6]=4
Order[7]=1

Figure 4:
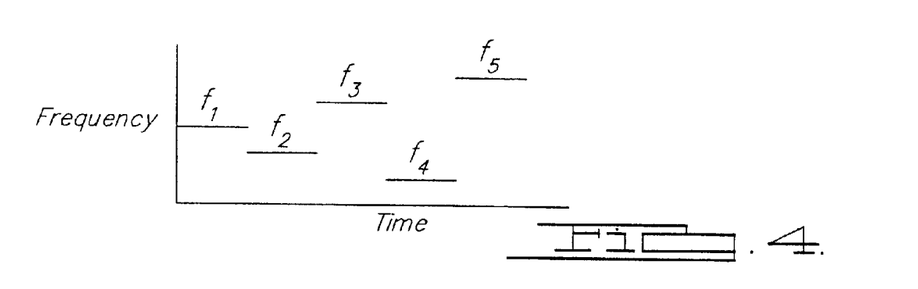
FIG. 4 illustrates the randomization of the discretized LFM signal of FIG. 3 in accordance with the instant invention.

The radar system then operates by transmitting frequencies for these steps according to F[Order[i]], for i=0, Num_ steps. This generates a frequency pattern shown numerically below, and as a hypothetical graphical representation in FIG. 4.

F[Order[0]]=F[5]=130.85
F[Order[1]]=F[7]=133.19
F[Order[2]]=F[2]=127.34
F[Order[3]]=F[3]=128.51
F[Order[4]]=F[0]=125.00
F[Order[5]]=F[6]=132.02
F[Order[6]]=F[4]=129.68
F[Order[7]]=F[1]=126.17

The number of possible patterns generated for a given frequency set would be (Num_steps)!, i.e., (Num_steps)!= (Num_steps) * (Num_steps-1) * (Num_steps-2). . . * 1. For a typical radar system 10, the number of steps may be between 50 and 200 steps, thereby providing an extraordinarily large number of unique frequency combinations. Referring to FIG. 6, the radar transmitter transmits a set of N (with the preferred embodiment being 8 or 16 sets) of these randomized frequency sequences for each beam direction that the sensor is analyzing.

In other words, two vehicles incorporating the radar system 10 of the instant invention would at most transmit the same frequency once during their respective code sequence and that event would occur with a probability of 1/128 for a 128 step system. Further, by randomizing the start frequencies to within a step size, the frequencies would not line up or be in synchronization. The system of the instant invention preferably uses a step size that is 2–3 times shorter than the desired range (this would increase the maximum unambiguous range so as to prevent repeated echoes from appearing as ghost targets). Thus, if another system were to transmit at a randomly chosen frequency within the actual large desired step, then for a 3:1 system there would be only a 0.333 probability of being at a frequency that could interfere due to the bandpass filters in the IF portion of the receiver subsystem.

Therefore, in the example system described above, with the maximum range set at 128 meters, f_step=1.17 Mhz. Further, the use of 0.39 Mhz steps provides a maximum range of 384 meters. So the first three steps (in normal order) would be:

F[0]=0.39
F[1]=0.78
F[2]=1.17

If another system randomly chose its start frequency to be between 0 and 1.17, it would fall between any 0–0.39, or 0.39–0.78 or 0.78–1.17 each with probability 0.333. But only if the start frequency is within the first step will there be any interference. Therefore, the probability of even a modest interference at only one frequency is only a 0.333.

Upon reception of the radar signal the signal processor initially orders the incoming data into a two-dimensional transmitted frequency-sequence number plot for M incoming frequencies and N complete sequences, as shown in FIG. 6. Traditional LFM radars transmit upward sloping ramps followed by downward sloping ramps to derive Doppler from the radar signal. In a ramp-up the Doppler results in a positive apparent increase in target range and the ramp down results in an apparent decrease in range, as known by one of ordinary skill in the art as range-Doppler coupling in LFM waveforms. The instant invention does not rely on the ramp-up and ramp-down sequencing to derive target speed, but instead incorporates a two dimensional Fourier Transform processing on the multiple sequences of the LFM signal to compute a range-Doppler two-dimensional "images" to simultaneously derive range and Doppler.

The ramp-up and ramp-down would not work in a randomized FSK approach to the LFM since the Doppler shift of the targets would corrupt the randomized sequence and then there is not way to extract it from the signal. In the instant invention once the frequency-sequence data array is fully populated as in FIG. 6, the data is then processed by a Doppler estimator 34 as illustrated in FIG. 7 using high resolution spectral estimation techniques to estimate the Doppler frequencies included in the data by processing the data in the sequence index direction. This produces a high resolution estimate of the frequency (Doppler) content present in each frequency step. Those practiced in the art of spectral estimation know that traditional methods such as Fourier Transform analysis would result in too low of a resolution estimate due to the short time duration (number of samples) to be processed. One of ordinary skill in the art will recognize that common methods such as Auto Regressive Modeling (ARMA) and Minimum Variance Spectral Estimation are just two such methods that would be applicable.

The key equations for Auto Regressive (AR) modeling are:

$$\hat{x}(n) = -\sum_{k=1}^{p} a(k)x(n-k)$$

$$\sum_{l=1}^{p} a(l)r_{xx}(k-l) = -r_{xx}(k)$$

$$k = 1, \ldots, p$$

$$P_{xx}(f) = \frac{\sigma^2}{\left|1 + \sum_{k=1}^{p} a(k)\exp(-j2\pi fk)\right|^2}$$

Where the a(l) are the modeling parameters and $\hat{x}$(n) is the estimated time series and $P_{xx}$(f) is the power spectral density function.

This high resolution estimation processing generates an ensemble of Doppler estimates (M where M is the number of frequency steps, 128 being our preferred embodiment). This ensemble is then integrated to derive a more accurate estimate of the Doppler spectrum at that particular sensor antenna pointing angle. The average spectrum is then analyzed for peaks in the integrated Auto-Regressive (AR) model output spectrum to determine the values of the target Doppler values. This integration process across all of the frequency step instances of the AR model is important to improve the probability of detecting all of the Doppler signals present since the AR modeling process is highly dependent upon the initial phase of the signal. Since each frequency step occurs at a different phase in the Doppler signal, a highly confident estimate of the AR model spectrum is possible. To reduce the overall processing load, optionally only a subset of the frequency step data may be used in generating the AR model coefficients and spectra.

Referring to FIG. 8, once the Doppler frequencies are estimated, they must be removed from the incoming data stream of frequency steps to ensure an uncorrupted range profile generation from the order-corrected LFM waveform.

In further accordance with the instant invention, if the system suspects that there has been repeated jamming due to an elevated noise floor, or large targets that do not re-appear, then the system can choose another start frequency, or go to its alternate random order vector and continue operation to further improve system immunity and operation.

Figure 9:
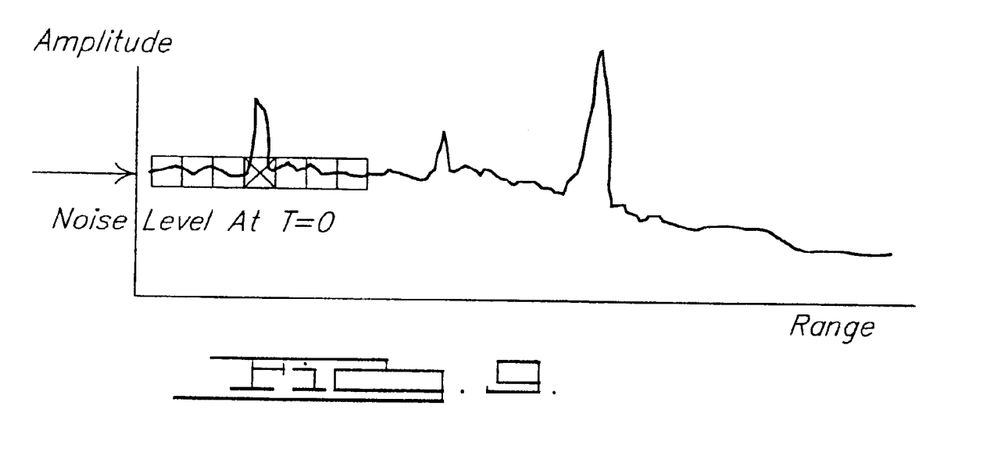
FIG. 9 illustrates the detected radar signal without the presence of an interfering signal.
Figure 10:
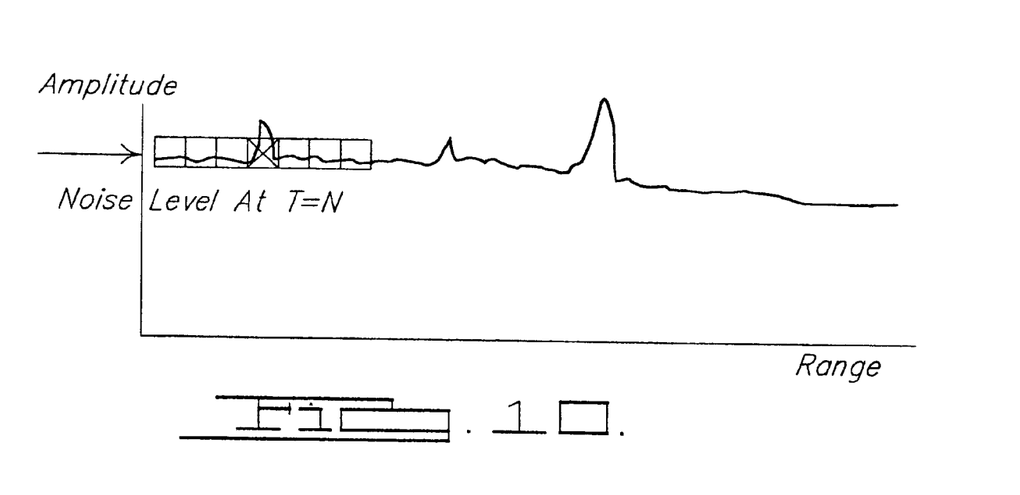
FIG. 10 illustrates the detected radar signal when an interfering signal is present

An elevated noise floor is easily detectable by analyzing the statistics of the background of the range-amplitude profiles. There are a number of possible embodiments of this portion of the processing. For example, since the system is already performing Constant False Alarm Rate (CFAR) processing, the median background of multiple background windows may be used. This could be accomplished as shown in FIGS. 9 and 10. The CFAR algorithm already computes an order statistic based on the window's surrounding targets. The set of these window values for each range-amplitude image can be temporally compared with window values from previous windows. Either parametric or non-parametric statistical analysis can then be performed to determine if these sequences of values are from the same distribution.

Since the clutter data is known in the art to be reasonably modeled by the Gamma distribution (if the clutter is relatively uniform), a parametric test on sequences of these window values can be used to determine if the values are all from the same distribution (i.e. same distribution parameters r and λ) or if the most recent value is from a distribution with another set of parameters. This is easily performed since the these two distribution parameters can be computed according to:

$$E(X) = \frac{r}{\lambda} \text{ and } Var(X) = \frac{r}{\lambda^2}$$

so by computing the mean and variance of the background windows, the two parameters of the distributions can be estimated. Then it is a matter of determining a desired confidence level in accordance with standard practices, known to those of ordinary skill in the art, for determining if the two data sequences are from the same distribution.

Likewise, if the clutter is relatively non-uniform, a non-parametric analysis of the data sequences may prove more reliable. There are many such tests, known to those of ordinary skill in the art, for example the Wilcoxon Sign Test or the Mann-Whitney Test. Another potentially useful test is the Kruskal-Wallis test which supports testing whether a sequence of values are from the same distribution based on their medians. A median test is particularly powerful in this application since targets may be present in some of the data windows, which would artificially skew the mean and variance calculations. It is interesting to note, however, that erroneous hypothesis tests that would lead to changing the transmission code have no negative effects on the system, since through the EPROM look-up table approach used to command the direct digital synthesizer there is no time delay in shifting to another code. Therefore, it is beneficial to err on the side of caution and set the hypothesis test threshold values relatively low which means possibly assuming that interference exists when none is present.

One other noteworthy feature is that since the look-up table approach is so easy to implement, the system can support using a different coded sequence for different beam locations. Therefore in situations where there is one vehicle within one beam direction that is causing an unacceptable amount of interference, and another vehicle in another beam also with a high level of interference, the system can transmit a different frequency code for each of these different beam locations.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A method of detecting objects with a radar, comprising:
   a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered, whereby a feature selected from the group consisting of the start time of said repetitive sequence of frequencies and the minimum frequency of said repetitive sequence of frequencies is randomly selected;
   b. illuminating the object with said continuous wave RF signal;
   c. receiving the component of said RF signal reflected by the object so as to form a received signal;
   d. measuring the complex amplitude of said received signal for each element of said repetitive sequence so as to form a first list of complex amplitudes;
   e. collecting said complex amplitudes for similar frequency elements of said repetitive sequence so as to form a second list of complex amplitudes;
   f. calculating the Doppler shift of said received signal from a spectral analysis of said second list of complex amplitudes;
   g. removing said Doppler shift from said first list of complex amplitudes so as to form a third list of complex amplitudes;
   h. reordering said third list of complex amplitudes in order of increasing transmitted frequency for each said sequence of frequencies so as to form an equivalent LFM received signal;
   i. forming a reordered representation of the transmitted RF signal in order of increasing transmitted frequency so as to form an equivalent LFM transmitted signal; and
   j. comparing said equivalent LFM received signal with said equivalent LFM transmitted signal so as to determine the range to the object.

2. A method of detecting objects with a radar, comprising:
   a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered, whereby said sequence of frequencies is in accordance with a pseudo-random code;
   b. illuminating the object with said continuous wave RF signal;
   c. receiving the component of said RF signal reflected by the object so as to form a received signal;
   d. measuring the complex amplitude of said received signal for each element of said repetitive sequence so as to form a first list of complex amplitudes;
   e. collecting said complex amplitudes for similar frequency elements of said repetitive sequence so as to form a second list of complex amplitudes;
   f. calculating the Doppler shift of said received signal from a spectral analysis of said second list of complex amplitudes;
   g. removing said Doppler shift from said first list of complex amplitudes so as to form a third list of complex amplitudes;
   h. reordering said third list of complex amplitudes in order of increasing transmitted frequency for each said sequence of frequencies so as to form an equivalent LFM received signal;
   i. forming a reordered representation of the transmitted RF signal in order of increasing transmitted frequency so as to form an equivalent LFM transmitted signal; and
   j. comparing said equivalent LFM received signal with said equivalent LFM transmitted signal so as to determine the range to the object.

3. A method of detecting objects with a radar as recited in claim 2, whereby said pseudo-random code sequence is selected from the group consisting of a different pseudo-random code sequence for different vehicles, a pseudo-random code sequence that is responsive to said direction, a pseudo-random code sequence that is pre-calculated.

4. A method of detecting objects with a radar, comprising:
   a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;
   b. illuminating the object with said continuous wave RF signal, whereby said continuous wave RF signal is radiated in a direction;
   c. receiving the component of said RF signal reflected by the object so as to form a received signal;
   d. measuring the complex amplitude of said received signal for each element of said repetitive sequence so as to form a first list of complex amplitudes;
   e. collecting said complex amplitudes for similar frequency elements of said repetitive sequence so as to form a second list of complex amplitudes;
   f. calculating the Doppler shift of said received signal from a spectral analysis of said second list of complex amplitudes;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal; and j. comparing said equivalent LFM received signal with said equivalent LFM transmitted signal so as to determine the range to the object.

5. A method of detecting objects with a radar, comprising:

a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;

b. illuminating the object with said continuous wave RF signal;

c. receiving the component of said RF signal reflected by the object so as to form a received signal;

d. measuring the complex amplitude of said received signal for each element of said repetitive sequence so as to form a first list of complex amplitudes;

e. collecting said complex amplitudes for similar frequency elements of said repetitive sequence so as to form a second list of complex amplitudes;

f. calculating the Doppler shift of said received signal from a spectral analysis of said second list of complex amplitudes, comprising a process selected from the group consisting of a two dimensional Fourier transformation and a high resolution spectral estimation process;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal; and j. comparing said equivalent LFM received signal with said equivalent LFM transmitted signal so as to determine the range to the object.

6. A method of detecting objects with a radar as recited in claim 5, whereby whereby the step of calculating the Doppler shift comprises a high resolution spectral estimation process and said high resolution spectral estimation process comprises a process selected from the group consisting of the formation of an ensemble of Doppler estimates and the calculation and analysis of the an average spectrum so as to determine said Doppler shift; an Auto Regressive Moving Average (ARMA) process; and a Minimum Variance Spectral Estimation process.

7. A method of detecting objects with a radar as recited in claim 5, wherein said Doppler shift is estimated from a subset of said second list of complex amplitudes.

8. A method of detecting objects with a radar, comprising:

a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;

b. illuminating the object with said continuous wave RF signal;

c. receiving the component of said RF signal reflected by the object so as to form a received signal;

d. measuring the complex amplitude of said received signal for each element of said repetitive sequence so as to form a first list of complex amplitudes;

e. collecting said complex amplitudes for similar frequency elements of said repetitive sequence so as to form a second list of complex amplitudes;

f. calculating the Doppler shift of said received signal from a spectral analysis of said second list of complex amplitudes, whereby said continuous wave RF signal is radiated in a direction and the step of calculating the Doppler shift is independently performed at each said direction;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal; and j. comparing said equivalent LFM received signal with said equivalent LFM transmitted signal so as to determine the range to the object.

9. A method of detecting objects with a radar, comprising:

a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;

b. illuminating the object with said continuous wave RF signal;

c. receiving the component of said RF signal reflected by the object so as to form a received signal;

d. measuring the complex amplitude of said received signal for each element of said repetitive sequence so as to form a first list of complex amplitudes;

e. collecting said complex amplitudes for similar frequency elements of said repetitive sequence so as to form a second list of complex amplitudes;

f. calculating the Doppler shift of said received signal from a spectral analysis of said second list of complex amplitudes;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal;

j. comparing said equivalent LFM received signal with said equivalent LFM transmitted signal so as to determine the range to the object; and k. Constant False Alarm Rate processing.

10. A method of detecting objects with a radar, comprising:

a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;

b. illuminating the object with said continuous wave RF signal;

c. receiving the component of said RF signal reflected by the object so as to form a received signal;

d. measuring the complex amplitude of said received signal for each element of said repetitive sequence so as to form a first list of complex amplitudes;

e. collecting said complex amplitudes for similar frequency elements of said repetitive sequence so as to form a second list of complex amplitudes;

f. calculating the Doppler shift of said received signal from a spectral analysis of said second list of complex amplitudes;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal;

j. comparing said equivalent LFM received signal with said equivalent LFM transmitted signal so as to determine the range to the object; and k. detecting the presence of interfering RF signals.

11. A method of detecting objects with a radar as recited in claim 10, further comprising the steps of calculating a noise floor and comparing said noise floor with a threshold.

12. A method of detecting objects with a radar as recited in claim 10, further comprising the steps of a. forming a time series of measurements, each said measurement comprising the components of said range to the object and the magnitude of said received signal;

b. partitioning said time series of measurements into a plurality of range-amplitude windows;

c. characterizing the distribution of said magnitude component as a function of said range component using a method of characterization within a range-amplitude window;

d. identifying a range-amplitude window for which there is no interference from an interfering RF signal;

e. storing said characterization for said identified range-amplitude window;

f. comparing said characterization with said stored characterization so as to form a measure of difference;

g. comparing said measure of difference with a threshold; and h. modifying said continuous wave RF signal if said measure of difference exceeds said threshold.

13. A method of detecting objects with a radar as recited in claim 12, whereby the step of modifying said continuous wave RF signal comprises a process selected from the group consisting of modifying said sequence of frequencies, modifying the minimum frequency of said sequence of frequencies, and modifying the start time of said repetitive sequence of frequencies.

14. A method of detecting objects with a radar as recited in claim 12, whereby the step of illuminating the object comprises radiating said continuous wave RF signal in a direction and the step of modifying said continuous wave RF signal is responsive to said direction.

15. A method of detecting objects with a radar as recited in claim 12, whereby said method of characterization is is selected from the group consisting of a parametric method in accordance with a Gamma distribution, a non-parametric method comprising a comparison of medians from different range-amplitude windows, the Wilcoxon Sign Test, the Mann-Whitney Test and the Kruskal-Wallis Test.

16. A method of detecting objects with a radar, comprising:

a. generating a continuous wave RF signal comprising a repetitive sequence of frequencies, wherein the duration of each element of the sequence is sufficient to propagate round trip to the target from the radar, the sequence of frequencies in said repetitive sequence is random and the sequence of frequencies is uniformly spaced when monotonically reordered;

b. illuminating the object with said continuous wave RF signal;

c. receiving the component of said RF signal reflected by the object so as to form a received signal;

d. measuring the complex amplitude of said received signal for each element of said repetitive sequence so as to form a first list of complex amplitudes;

e. collecting said complex amplitudes for similar frequency elements of said repetitive sequence so as to form a second list of complex amplitudes;

f. calculating the Doppler shift of said received signal from a spectral analysis of said second list of complex amplitudes;

g. removing said Doppler shift from said first list of complex amplitudes so as to form a third list of complex amplitudes;

h. reordering said third list of complex amplitudes in order of increasing transmitted frequency for each said sequence of frequencies so as to form an equivalent LFM received signal;

i. forming a reordered representation of the transmitted RF signal in order of increasing transmitted frequency so as to form an equivalent LFM transmitted signal;

j. comparing said equivalent LFM received signal with said equivalent LFM transmitted signal so as to determine the range to the object; and k. controlling the actuation of a motor vehicle safety restraint system responsive to said range to the object.

17. A method of detecting objects with a radar as recited in claim 16, further comprising controlling the actuation of the safety restraint system responsive to said Doppler shift.

18. A radar, comprising:

a. direct digital synthesizer for generating a first oscillation signal having a first frequency of oscillation;

b. an intermediate frequency source for generating a second oscillation signal having a first frequency of oscillation;

c. a first mixer operatively connected to said direct digital synthesizer and to said intermediate frequency source for generating from said first and second oscillation signals a third oscillation signal having a third frequency of oscillation;

d. a direct reference oscillator for generating a fourth oscillation signal having a fourth frequency of oscillation e. a second mixer operatively connected to said direct reference oscillator and to the output of said first mixer for generating from said third and fourth oscillation signals a fifth oscillation signal having a fifth frequency of oscillation;

f. a circulator operatively connected to the output of said second mixer;

g. at least one transmitting antenna for illuminating the object with a transmitted RF signal, whereby said at least one transmitting antenna is operatively connected to said circulator, whereby said circulator couples said fifth oscillation signal into said at least one transmitting antenna, said at least one transmitting antenna radiates said fifth oscillation signal;

h. at least one receiving antenna for receiving as a received RF signal a component of said transmitted RF signal reflected by the object, whereby said at least one receiving antenna is operatively connected to said circulator, said at least one receiving antenna receives said reflected component;

i. a third mixer operatively connected to said circulator and to said direct reference oscillator, whereby said circulator couples said received RF signal into said third mixer and said third mixer generates from said received RF signal and said fourth oscillation signal an intermediate RF signal;

j. a fourth mixer operatively connected to said direct digital synthesizer and to the output of said third mixer for generating from said first oscillation signal and said intermediate RF signal detected RF signal;

k. a quadrature phase shifter operatively connected to the output of said fourth mixer for shifting the phase of said detected RF signal by ninety degrees so as to create a phase-shifted detected RF signal;

l. a first analog-to-digital converter for sampling said detected RF signal;

m. a second analog-to-digital converter for sampling said phase-shifted detected RF signal; and n. a signal processor operatively connected to said first and second analog-to-digital converters and to said direct digital synthesizer, whereby said signal processor controls the operating frequency of said DDS responsive to a pseudo-random code from said signal processor, said pseudo-random code comprises a plurality of levels, each said level maintained for a period of time, said plurality of levels are uniformly spaced when monotonically reordered, said period of time is sufficient for the round trip propagation of said transmitted RF signal to the target from the radar, said pseudo-random code is repeated as a repetitive sequence, the sampled signals from said first and second analog-to-digital converters are transformed to a measured complex amplitude, and said signal processor further comprises:

(i) a memory for storing said measured complex amplitude in a first series;

(ii) a memory for storing the complex amplitudes for similar frequency elements of said repetitive sequence as a second series, whereby said second series is calculated for each said frequency element;

(iii) a memory for storing the Doppler shift of said received signal calculated by said signal processor from a spectral analysis of said second series;

(iv) a memory for storing a third series formed by removing the Doppler shift from said first series;

(v) a memory for storing a fourth series calculated by said processor from said third series by reordering said third series in order of increasing transmitted frequency;

(vi) a memory for storing a fifth series comprising a representation of the transmitted RF signal in order of increasing transmitted frequency;

(vii) a memory for storing as a sixth series the difference in frequency by said processor of said fourth and fifth series, whereby said processor calculates the range to the object from said sixth series.

19. A radar as recited in claim 18, whereby said at least one transmitting antenna and said at least one receiving antenna are the same at least one antenna.

20. A radar as recited in claim 19, further comprising a beam director operatively connected to said at least one transmitting antenna and to said signal processor, said at least one transmitting antenna radiates said fifth oscillation signal in a first direction, and said first direction is controlled by said beam director, said at least one receiving antenna is operatively connected to said beam director, said at least one receiving antenna receives said reflected component in a second direction, and said second direction is controlled by said beam director, said first and second directions are controlled by said signal processor.

21. A radar as recited in claim 18, said at least one transmitting antenna and said at least one receiving antenna comprise a plurality of antenna elements, each of said plurality of antenna elements disposed in a different orientation, wherein for each said of said plurality of antenna elements is both one of said at least one transmitting antenna and one of said at least one receiving antenna.

22. A radar as recited in claim 21, whereby said beam director controls which said each of said plurality of antenna elements is active;

23. A radar as recited in claim 18, whereby said signal processor further comprises:

(viii) a memory for storing as a seventh series the magnitude of said first series as a function of said calculated range from said sixth series; and (ix) a constant false alarm rate processor for detecting from said seventh series the presence of interference to said received RF signal.

* * * * *